United States Patent [19]
Edwards

[11] Patent Number: 5,158,125
[45] Date of Patent: Oct. 27, 1992

[54] CARVING JIG

[75] Inventor: Bronte N. Edwards, Woodville, Australia

[73] Assignee: Woodfast Machinery Co., Australia

[21] Appl. No.: 768,163

[22] Filed: Sep. 30, 1991

[30] Foreign Application Priority Data

Oct. 3, 1990 [AU] Australia .................. PK2596

[51] Int. Cl.$^5$ ............................................. B27C 5/00
[52] U.S. Cl. .................................. 144/137; 144/139;
144/154; 269/68; 279/5; 409/221
[58] Field of Search ............... 142/52, 55; 144/137,
144/138, 139, 154; 269/55, 67, 68; 279/5;
408/90; 409/220, 221, 222, 224

[56] References Cited

U.S. PATENT DOCUMENTS

| 500,540 | 7/1893 | Koenig | 269/68 |
| 3,380,322 | 4/1968 | Brault | 269/67 |
| 4,872,792 | 10/1989 | McCubbin | 409/221 |

Primary Examiner—W. Donald Bray
Attorney, Agent, or Firm—Brown, Martin Haller & McClain

[57] ABSTRACT

A carving jig (10) is provided with a base (11) having a bearing (17) in which a projecting spindle (18) is journalled for rotation, the spindle having facilities to allow a workpiece (24) to be attached, either directly or through the provision of an intermediate chuck (23), the jig also having a flat mounting surface (12, 13), which is normal to the axis of spindle (18) rotation, and the spindle (18) having an indexing disc (26) attached to it, so that it can be rotated in increments, but restrained against rotation during carving.

8 Claims, 3 Drawing Sheets

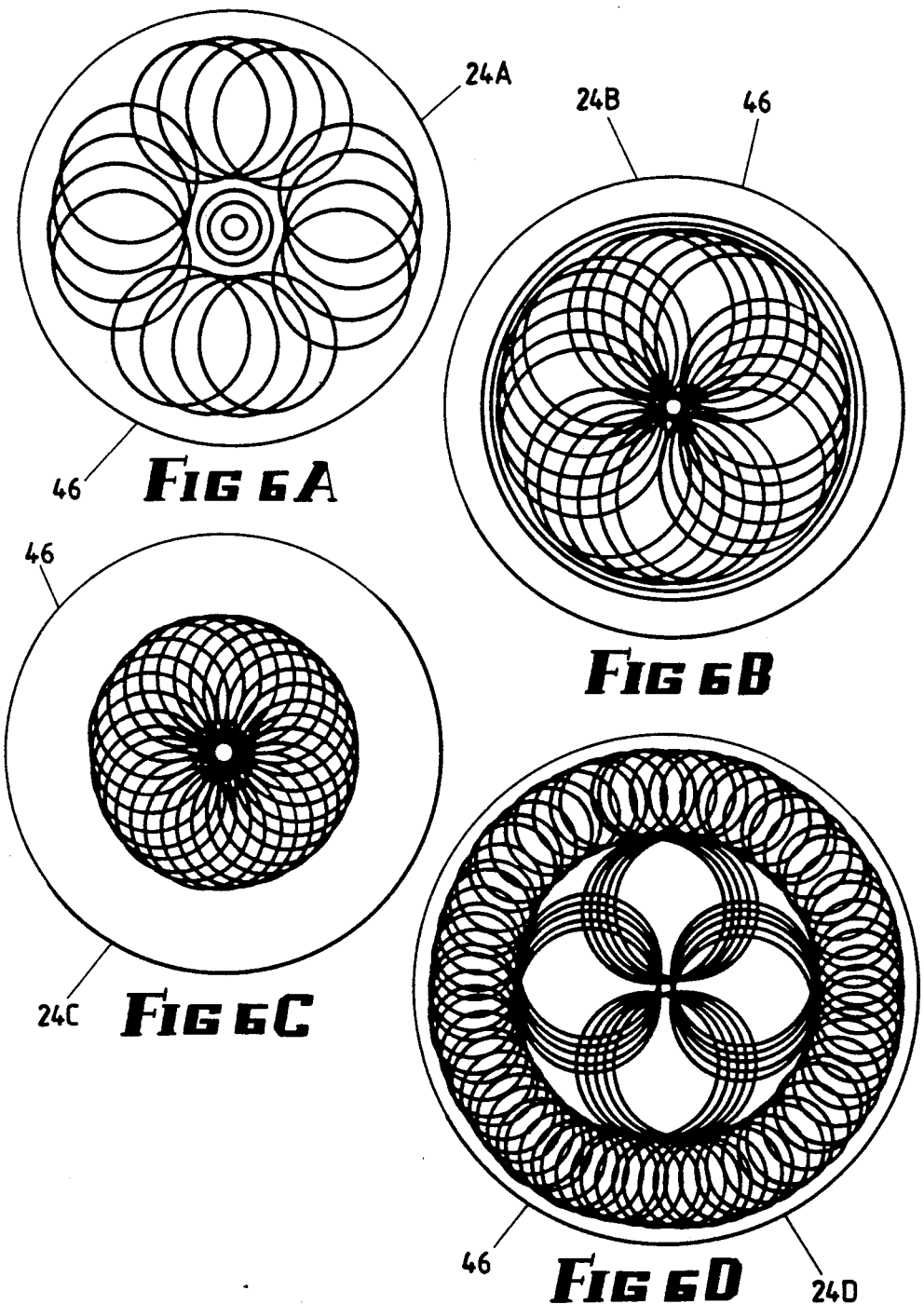

CARVING JIG

This invention relates to a carving jig which is useful for achieving intaglio (incised carved) patterns in readily machinable material, and although not necessarily limited to be an accessory for a lathe, the invention is particularly applicable as such, being adaptable for use in conjunction with a lathe chuck, or if desired, with a drill press.

BACKGROUND OF THE INVENTION

Forming integlio type patterns is an old art dating back more than two hundred years, but the lathes that were then used were very complex, sometimes employing large numbers of spur gears, cable and drum arrangements or both, to achieve the various patterns required. Such lathes were generally known as Holt-Zapffel lathes, and their cost was very high, and only in recent years have manufacturers attempted to produce ornamental lathes at a viable cost, but most of these are based on the same principles as the lathes used in the eighteenth and nineteenth centuries, and are much more expensive than simple wood lathes. A book entitled "Ornamental Turning" by T. D. Walshaw contains detailed information on history and prior art. That book was published by Argus Books, Hemel Hempstead, Herts., England.

The invention is not necessarily limited to use with a chuck attachable to the spindle of a wood lathe but is suitable for such use, since most intaglio type patterns are formed in materials which have been turned on wood lathes, including wood itself, aluminium, certain hard plastics and other materials which are readily machined. Intaglio type patterns have been formed previously utilising lathe attachments for wood lathes, but since the cost of the attachments which have been used has been very high, the art has almost been lost, yet there is a requirement for ornamentation of the type which can be achieved by rotation of a cutting tool to cut grooves in the surface of the workpiece which intersect one another to provide an aesthetically pleasing pattern.

The main object of this invention therefore is to provide a carving jig which can be used as an accessory to a lathe, and wherein the jig can hold a workpiece which can be positioned in alternative positions so as to be capable of producing a plurality of patterns by a cutter, for example a fly cutter, and which can be readily varied to suit alternative requirements.

BRIEF SUMMARY OF THE INVENTION

A carving jig is provided with a base having a bearing in which a projecting spindle is journalled for rotation, the spindle having facilities to allow a workpiece to be attached, either directly or through the provision of an intermediate chuck, the jig also having a flat mounting surface, which is normal to the axis of spindle rotation, and the spindle having an indexing disc attached to it, so that it can be rotated in increments, but restrained against rotation during carving.

Such a jig can be used in a lathe or a drill press, and can be arranged for carving a pattern in a flat or in a curved surface.

More specifically, the invention consists of a carving jig having a base, at least one flat mounting surface on the base, a bearing surface in the base, a spindle rotatable in the bearing surface about an axis and projecting therefrom, both workpiece securing means and an indexing disc carried on the spindle projection, and a detent on the base co-operable with the indexing disc operable to either allow disc rotation, and thereby workpiece rotation, between circumferentially spaced work stations, or restrain the disc and workpiece at any one of said stations.

BRIEF SUMMARY OF THE DRAWINGS

An embodiment of the invention is described hereunder in some detail with reference to, and is illustrated in, the accompanying drawings, in which:

FIG. 6 depicts workpieces on which various intaglio designs have been developed utilising the invention.

In this invention, jig 10 comprises a base 11 which has two flat mounting surfaces 12 and 13 by which it can be mounted in either one of two planes normal to one another on a substrate, and FIG. 5 illustrates as a substrate the table 14 of a drill press 15.

Figure 2:
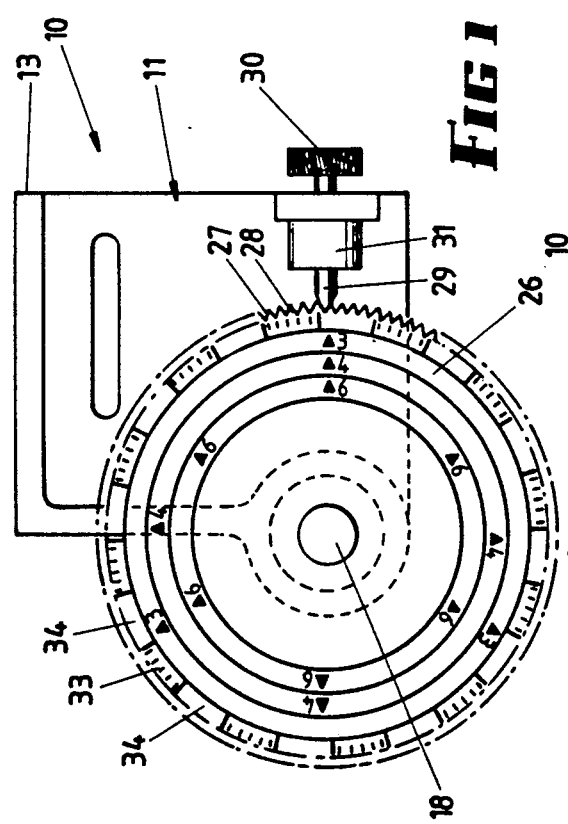
FIG. 2 is a partly sectioned side elevation of FIG. 1.

The jig 10 is provided with a bearing housing 17 which projects outwardly from a portion of the jig, and contains a bearing surface which rotationally supports a sleeve 19 from which projects a spindle 18. The spindle 18 can then rotate along with sleeve 19 about an axis AA which is normal to the support surface 12, but parallel to although displaced from the support surface 13. Sleeve 19 is restricted within the bearing housing 17 against axial movement by a nut and washer assembly 20 (FIG. 2). The spindle 18 is provided with an external thread 22 which is standard for a wood lathe chuck so that a wood lathe chuck 23 can be screwed onto the spindle 18 by removing it from a wood lathe, whereby a workpiece 24 can be accurately retained in position on the jig 11 for ornamentation purposes.

Figure 1:
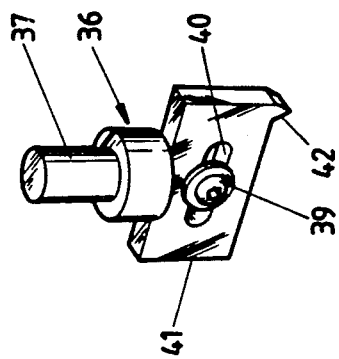
FIG. 1 is a plan view of a jig when used on an horizontal substrate with its axis of rotation normal to the substrate.

The spindle 18 is fast with an indexing plate 26 of discoid shape and having a peripheral edge 27 containing a series of equally spaced teeth 28, in this embodiment there being 120 teeth, and inclined surfaces which define the teeth 28 are engageable by a spring loaded locking pin 29 coupled to a withdrawal disc 30 and slidable in a boss 31 of base 11. By this arrangement, the plate 26 can be indexed between stations by any number of teeth which is divisible into the total of 120. That is, the indexing number can be 1, 2, 3, 4, 5, 6, 8, 10 etc. To make it simple for an operator to identify the number of teeth by which the indexing plate is indexed between cuts, the plate is divided into mark spaces 33 and blank spaces 34 near the edge 27, and as shown in FIG. 1, the subdivisions of 3, 4 and 6 are aligned with the locking pin 29.

Figure 3:
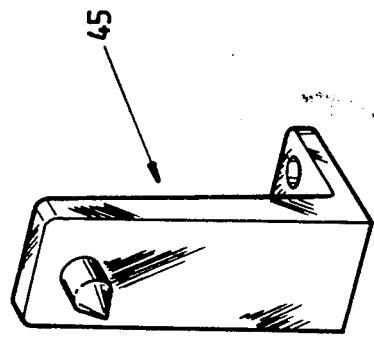
FIG. 3 is a perspective view illustrating one form of cutter which is usable.

The cutting tool comprises a very simple form of fly cutter being shown in FIG. 3, wherein a fly cutter 36 comprises an upstanding spindle 37 which can be retained by a chuck 38 of the drill press 15, and a locking screw 39 passes through a slot 40 in the cutting tool 33 which is sharpened to give a V-shaped cutting point 41 and by slightly unscrewing screw 39 and moving the cutting point 41 the diameter of an incised groove in a workpiece 24 can be reduced or increased. For small diameter circular cuts, a length of circular bar tool steel may be formed to have a cutting edge radially displaced from the axis of rotation, while in other embodiments use can be made of tubular cutters with a plurality of teeth.

Figure 4:
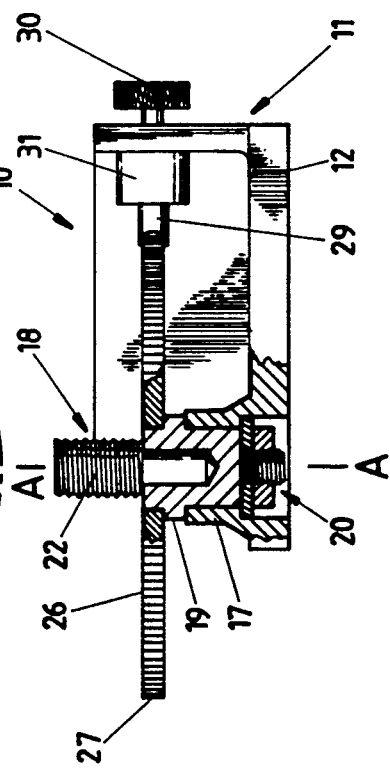
FIG. 4 is a perspective view of a tail stock.

Sometimes it is desired to cut a curved surface of a workpiece, and this is achieved by supporting base 11 on its mounting surface 13, and utilising a tail stock 45 (FIG. 4) to centre the end of a workpiece remote from chuck 23, this technique being well known elsewhere in the art of lathe turning.

Figure 5:
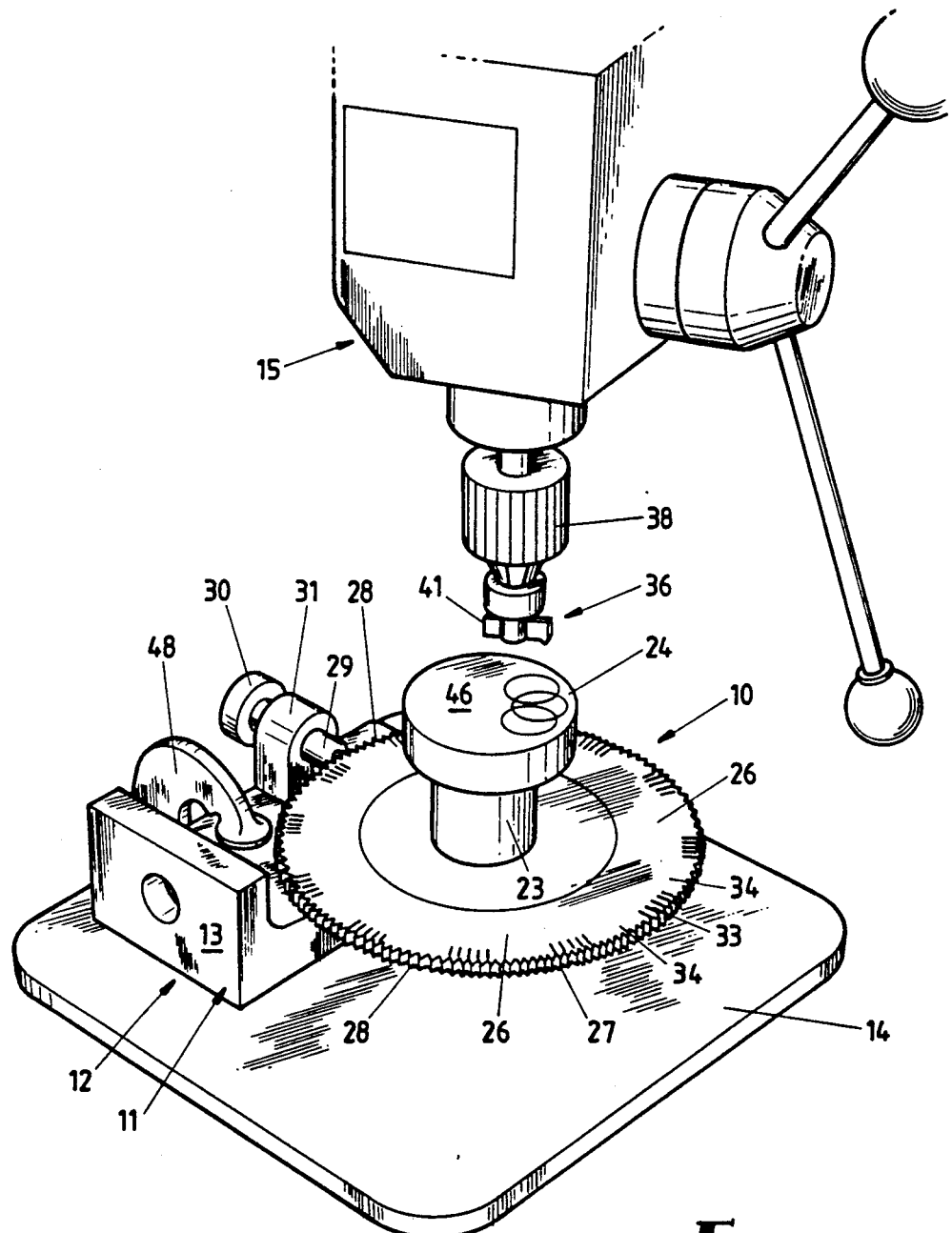
FIG. 5 is a fragmentary perspective showing the manner in which the jig can be employed on a drill press.

As illustrated in FIG. 5, the workpiece 24 is retained fast with the indexing plate 26 by merely screwing the lathe chuck 23 onto the spindle 18, and thereby symmetry with the axis AA is maintained. The drill press 15 is then operated to cut the end face 46 of the workpiece 24, with the jig supported on its support surface 12. If, however, the jig is supported on the support surface 13, the curved surface of the workpiece 19 can be engraved with the fly cutter 28. A clamp 37 can be used for clamping the jig to the table 14.

FIG. 6 illustrates various patterns which are readily out in a very short time with this inexpensive accessory.

For example, the pattern of FIG. 6A comprises a central circular cut surrounded by an annulus of circular engraved grooves cut by fly cutter 36. The annulus of circular grooves comprises four divisions of four circles per pattern, so that the indexing plate is set on number 4 and cut on every fourth tooth before being rotated around at 90° to the next number 4.

In FIG. 6B, there are again four divisions with six circular grooves per division in an annular pattern of circles, but it will be noted that the fly cutter 36 is set to cut a groove which will intersect at the central axis AA of the spindle. The cutter 41 is set to the required position by increasing the throw or diameter of the fly cutter point 41, and the indexing plate is advanced six teeth from one number 4 marking, then rotated by 90° from its initial position to the second number 4 marking and repeated. The intersection of the grooves results in an embossment appearance particularly near the centre of the workpiece.

In the example shown in FIG. 6C, there are twenty-four divisions without any "jumps", and the cutter again works from the centre. Being twenty-four divisions, the advancement is five teeth per indexing step.

In FIG. 6D, the inner pattern has five circles cut in each of four patterns in the same way as FIG. 6B, but the outer annulus of circular grooves is cut with a sequence of advancing one tooth, one tooth, two teeth, one tooth, two teeth, etc.

It will be appreciated that the invention provides a means whereby intaglio type patterns can be formed with circular cuts, and this can be achieved both on a flat surface as shown and also on a curved surface of a turned workpiece.

What I claim is:

1. A carving jig having a base, at least one flat mounting surface on the base, a bearing surface in the base, a spindle rotatable in the bearing surface about an axis and projecting therefrom, both workpiece securing means and an indexing disc carried on the spindle projection, a detent on the base co-operable with the indexing disc operable to either allow disc rotation, and thereby workpiece rotation, between circumferentially spaced work stations, or restrain the disc and workpiece at any one of said stations, and a fly cutter separate from but co-operable with said base in effecting intaglio incisions in a workpiece when carried on said securing means, said fly cutter comprising a cutting spindle and a cutting tool having a cutting point at one end fast with the cutter spindle but radially spaced from an axis of rotation of the cutter spindle.

2. A carving jig according to claim 1 having two flat mounting surfaces on the base, one said flat mounting surface being normal to said axis of rotation and the other said flat mounting surface being parallel to said axis but displaced therefrom.

3. A carving jig according to claim 1 further comprising a sleeve having a bearing surface rotationally engaging said base bearing surface, said spindle being fast with and projecting from said sleeve, said workpiece securing means comprising a thread on the spindle projection, and retaining means on the sleeve restricting axial movement of the sleeve in the base.

4. A carving jig according to claim 3 wherein said spindle thread is a standard lathe chuck thread, and said workpiece securing means further comprises a lathe chuck threadably engaging the spindle thread.

5. A carving jig according to claim 3 wherein said workpiece securing means further comprises a tail stock which is separate from but co-operable with said spindle for retention of a workpiece.

6. A carving jig according to claim 1 wherein said disc comprises a generally circular edge having a plurality of pairs of faces forming peripheral teeth, and said detent comprises a slidable locking pin releasably engageable with said faces.

7. A carving jig according to claim 6 further comprising a plurality of markings on a face of said disc near its said edge, separated by an equal plurality of spaces.

8. A carving jig according to claim 1 wherein said cutting tool has a slot between its ends, and further comprising a screw extending through the slot and threadably engaging the spindle, the radius of rotation of the cutting point thereby being adjustable.

* * * * *